Sept. 20, 1938.  W. O. THEWES  2,130,934

TUBING CUTTER

Filed Nov. 4, 1935

Inventor
WILLIAM O. THEWES

By Richey & Watts

Attorneys

Patented Sept. 20, 1938

2,130,934

UNITED STATES PATENT OFFICE 2,130,934

TUBING CUTTER

William O. Thewes, North Ridgeville, Ohio, assignor to The Ridge Tool Company, North Ridgeville, Ohio, a corporation of Ohio Application November 4, 1935, Serial No. 48,113

6 Claims. (Cl. 30—102)

This invention relates to improvements in pipe cutting tools and more particularly to a pipe cutting tool particularly adapted to the cutting of thin walled metallic tubing such as copper, brass, or the like.

Pipe cutting tools usually include a substantially C-shaped frame which supports a sharp edged cutting wheel and have an adjustable slide for holding the tubing in engagement therewith, the tool being rotated about the tube causing the wheel to sever the same.

Heretofore the slides on the cutting tools for engaging the tube have been reciprocably mounted upon suitable ways which extend longitudinally of the cutter, the slide being provided with guides which engage the ways. Some cutting tools have the slide body in one integral piece in which event suitable notches must be provided which correspond with similar notches on the ways to permit assembly of the same on the ways. One such tool is shown in my Patent No. 1,833,980 of December 1, 1931. Still other slides have been made in several parts which are assembled on the ways and then bolted together. These prior devices and the manner of mounting the slides on the ways in the device have various disadvantages. In devices where the ways are notched the tool frame is materially weakened and there is not a smooth traveling surface for the slide. In the case where the slide is held together with bolts the device is expensive to manufacture and the bolts soon come loose and are lost. If the slide parts are riveted together replacement is difficult, if not impossible.

With my improved cutter the ways or guides are integral with the frame and are uninterrupted throughout the length of the frame, and the slide is held in close sliding engagement on the ways without the use of bolts or rivets.

Still another advantage of my improved construction resides in the provision of the reamer for removing the fin of metal from the severed stock on the side of the frame instead of on the end, thus permitting the frame to act as a T handle for the reamer and furnishing a greater leverage for operating the same.

Still other advantages of the device and the device itself will become more apparent from the following description of an embodiment thereof which, together with the accompanying drawing, forms a part of this specification.

Figure 1:
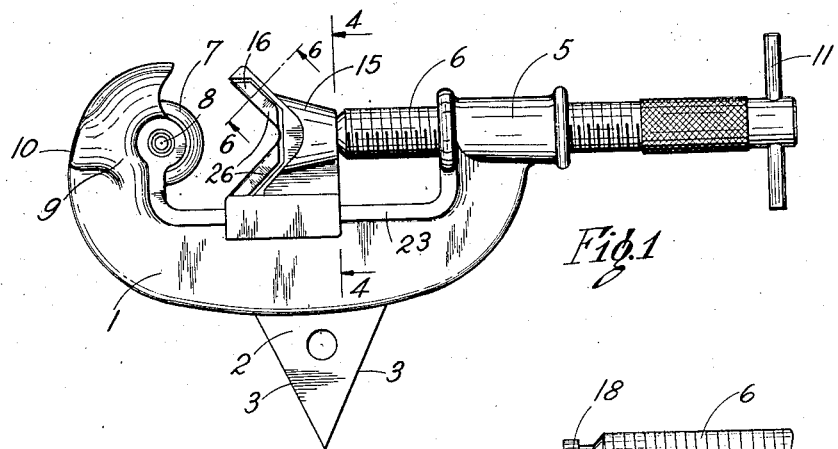
Fig. 1 is a side view of the device.
Figure 2:
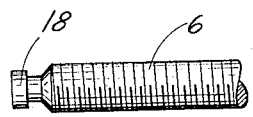
Fig. 2 is a fragmentary view of the actuating screw for moving the slide.

Referring now to the drawing throughout which like parts have been designated by like reference characters I provide a C-shaped frame 1 which may be die cast of a suitable metal and which is provided with a steel insert 2 cast into the body of the frame. The insert 2 constitutes a reamer being substantially triangular in form and extending from the body of the same, the edges 3 being the cutting or reaming surfaces. The end of the frame is formed with an integral boss 5 which has an internally threaded bore adapted to receive a threaded operating screw 6 provided with an operating handle 11 for moving the slide hereinafter described. The other end of the frame is provided with a pocket 9 in which a cutting wheel 7 is disposed, the wheel being rotatably supported by a pin 8. The pocket opens through the end of the frame at 10 to permit material to be discharged therefrom.

Figures 3, 4, 5:
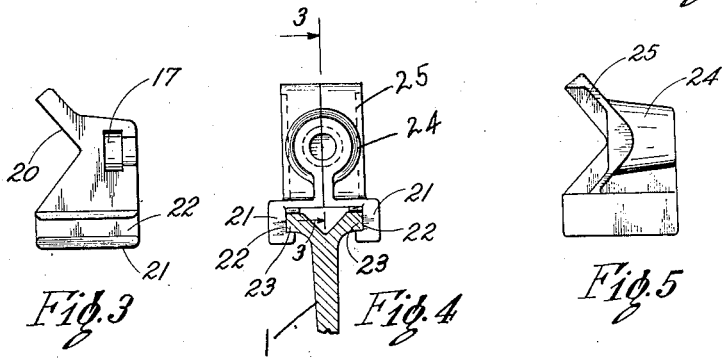
Fig. 3 is a view showing the inside surface of one of the slide sections.
Fig. 4 is a sectional view taken on the line 4—4 of Fig. 1.
Fig. 5 is an elevational view of the outside of one of the slide sections.
Figures 6, 7:
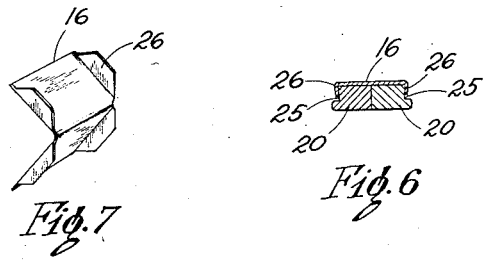
Fig. 6 is a sectional view taken on the line 6—6 of Fig. 1.
Fig. 7 is a perspective of the wear plate and clamp for the slide.

The slide, designated generally at 15, is die cast in two parts comprising right and left halves adapted to be held together in operative position on the frame by a wear plate or clip 16 (Fig. 7). Each half of the slide is provided on its inner face with a socket 17, the exterior face provided with a frusto-conical base 24, said socket adapted to receive and provide a thrust engagement for the head 18 of the screw 6. A V-shaped portion or V-block 20 is provided for the tube engaging end of the slide and a depending flange member 21 is formed integral with the slide, being provided with a channel 22 adapted for sliding engagement with the ways or guideways 23 on the frame. The frame is provided with a V-shaped channel between the ways, as best shown in Fig. 4. The outside edge of each of the V-shaped portions is provided with a recess 25 formed to receive the winged tongues 26 of the V-clip or wear plate and are inclined inward toward the back as best shown in Fig. 6, the better to retain the inwardly bent wings 26 of the V-plate.

As previously stated the frame may be die cast and the two parts of the slide 15 are also die cast in right and left pairs with their inner faces adapted to match. In assembling the device the screw 6 is threaded through the boss 5 and the slide 15 is assembled on the ways 23 with the recesses 17 engaging the thrust member 18 on the end of the screw. The slide clip and wear plate 16 is then sprung over the free ends of the slide parts with the tongues 26 engaging in the recesses 25, securely holding the slide on the ways 23 as well as retaining the head 18 of the screw. The V-plate 16 is of thin spring steel or similar material and provides a hardened surface for engagement with the tube, at the same time it has sufficient inherent resiliency to securely hold the slide parts together.

In operation the cutter is used in the ordinary manner, the slide being urged into engagement with the tube by the screw 6 and pulling the cutting wheel 7 against the tube, the tool then being rotated about the tube severs the same. After the tube is severed the reamer 3 is used for removing the fin of metal usually found on the end of the tube after severing the same. By positioning the reamer on the frame as shown in Fig. 1, a firm grip of substantial leverage is provided for operation thereof.

It will thus be seen that the slide being disposed on uninterrupted ways permits the same to operate smoothly and at the same time the strength of the frame is not affected. The slide is inexpensive to manufacture there being no machining operations; there are no bolts for holding the V-block together to come loose; and the slide parts if worn can be quickly replaced by removing the V-plate 16 and substituting new portions. In operation pressure upon the V-plate serves to hold the slide parts more firmly in position.

Having thus described my invention, I am aware that numerous and extensive departures may be made therefrom but without departing from the spirit and scope of the appended claims.

I claim:

1. In a tubing cutter, a frame, a cutter wheel carried by the frame, a guideway extending longitudinally of said frame, a V block reciprocable on the guideway and comprising two sections, and a face plate clamping said sections together in engagement with the guideway, said face plate providing a wear surface for the tube engaging portions of the V block.

2. In a device of the class described, a frame, uninterrupted ways extending laterally from the frame and longitudinally along the frame, a screw journalled in one end of the frame, and a cutter wheel carried by the other end of the frame, a slide for engaging a tube disposed on said ways and comprising complementary sections, a face plate for said slide having tongues adapted to engage the opposite sides of the slide to retain the slide on the frame and permit assembly on the frame.

3. In a device of the class described, a C-frame, a screw threaded through one end of the C-frame, a cutting wheel rotatably journalled in the other end of the C-frame, a pair of uninterrupted guideways extending longitudinally along the frame between the ends thereof and extending laterally therefrom means to hold a tube in engagement with the cutter wheel comprising a slide slidably disposed on the guideways, said slide comprising complementing elements, each of said elements having a screw head receiving recess and a guideway engaging channel, means to hold the slide in assembled position on said guideways and connected to the screw head comprising a substantially V-shaped resilient metal clip adapted to act as a face or wear plate for the slide and provided with tongues adapted to be sprung into engagement with opposing sides of the slide.

4. In a device of the class described, a frame, a pair of guideways on the frame, a slide slidably disposed on the guideways, said slide comprising right and left halves, and means to hold the halves together on the frame comprising a resilient metal face plate adapted to engage the face of the slide and having tongues for gripping opposite sides of the slide.

5. In a device of the class described, a frame, a pair of guideways on the frame, a slide slidably disposed on the guideways, said slide comprising complementary elements, each of said elements having a guideway engaging channel, means to hold the slide in assembled position on said guideways comprising a substantially V-shaped resilient metal clip adapted to act as a face or wear plate for the slide and having tongues adapted to be sprung into engagement with the opposing sides of the slide.

6. In a device of the class described, a frame, a pair of guideways on the frame, a screwhead, a slide slidably disposed on the guideways, said slide comprising complementary elements, each of said elements having a guideway engaging channel, means to hold the slide in assembled position on said guideways and connected to the screwhead comprising a substantially V-shaped resilient metal clip adapted to act as a face or wear plate for the slide and provided with tongues adapted to be sprung into engagement with opposing sides of the slide.

WILLIAM O. THEWES.

CERTIFICATE OF CORRECTION.

Patent No. 2,130,934. September 20, 1938.

WILLIAM O. THEWES.

It is hereby certified that error appears in the printed specification of the above numbered patent requiring correction as follows: Page 1, second column, line 18, for the word "same" read frame; line 36, for "base" read boss; and that the said Letters Patent should be read with this correction therein that the same may conform to the record of the case in the Patent Office.

Signed and sealed this 25th day of October, A. D. 1938.

Henry Van Arsdale (Seal) Acting Commissioner of Patents.